(No Model.) 3 Sheets—Sheet 1.
L. B. WHITE.
PLOW.
No. 313,394. Patented Mar. 3, 1885.
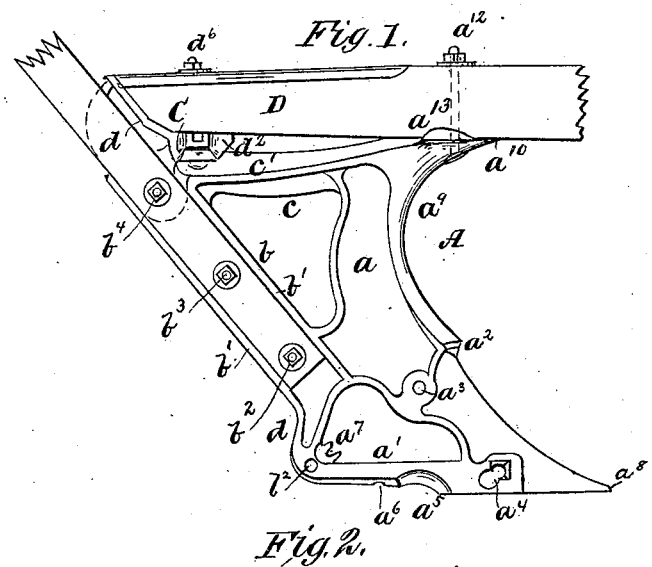
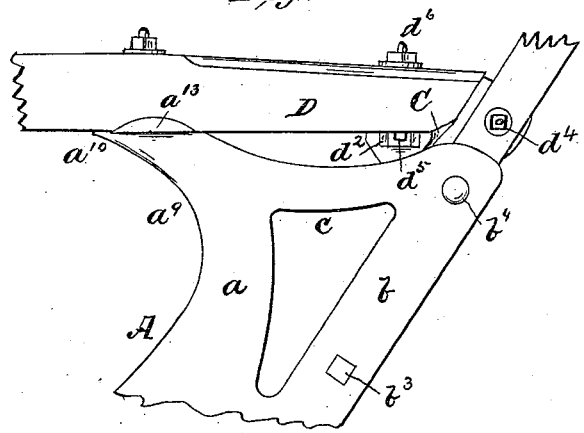
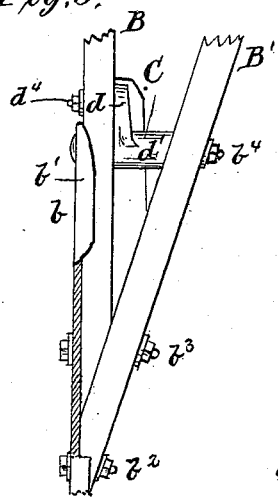
Witnesses:
P. B. Turpin
J. N. Giffin
Inventor
Lewis B. White
By R. S. & A. P. Lacey
Att'ys.
N. PETERS. Photo-Lithographer, Washington, D. C.

(No Model.) 3 Sheets—Sheet 2.
L. B. WHITE.
PLOW.
No. 313,394. Patented Mar. 3, 1885.

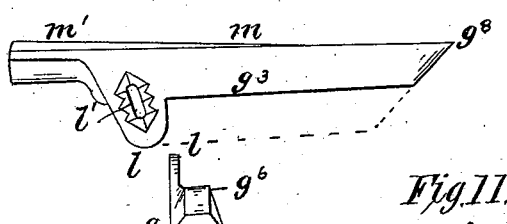
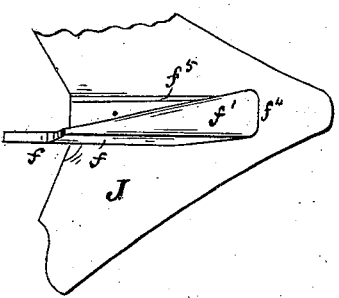

Witnesses:
P. B. Turpin
T. N. Griffin
Inventor:
Lewis B. White
By R. S. & A. P. Lacey
Att'ys.

(No Model.) 3 Sheets—Sheet 3.

L. B. WHITE.
PLOW.

No. 313,394. Patented Mar. 3, 1885.

Witnesses: Inventor:
P. B. Turpin. Lewis B. White
T. M. Griffin. By R. S. & A. P. Lacey
Att'ys.

UNITED STATES PATENT OFFICE.

LEWIS B. WHITE, OF NORFOLK, VIRGINIA.

PLOW.

SPECIFICATION forming part of Letters Patent No. 313,394, dated March 3, 1885.

Application filed May 4, 1882. (No model.)

*To all whom it may concern:*

Be it known that I, LEWIS B. WHITE, a citizen of the United States, residing at Norfolk, in the county of Norfolk and State of Virginia, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention set forth in this application relates in part to improved heel or landside-pieces for plows, and also to improvements in standards adapted to carry the said heel or landside and other parts of my invention, all of which will be hereinafter fully described.

Figure 4:
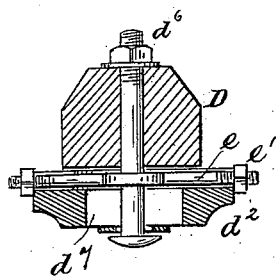
Figure 5:
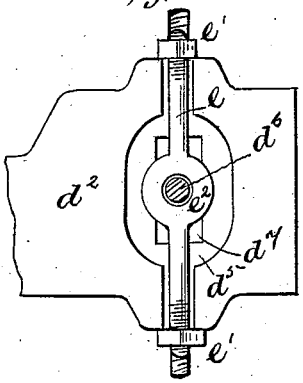
Figure 6:
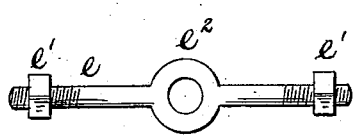
Figure 7:
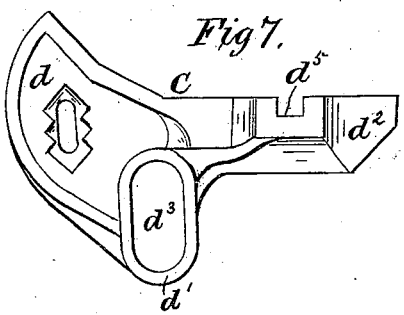
Figure 8:
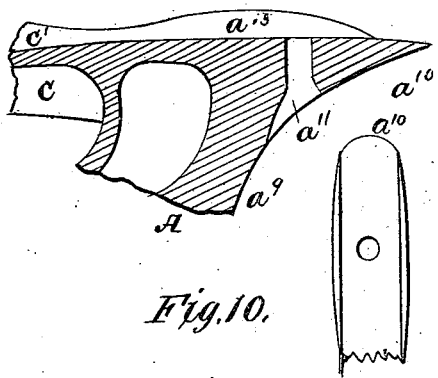
Figure 9:
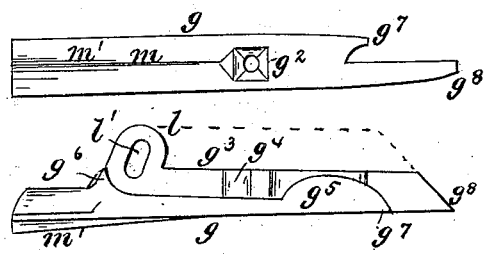
Figure 10:
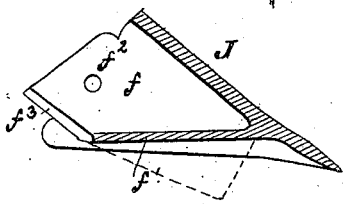
Figure 11:
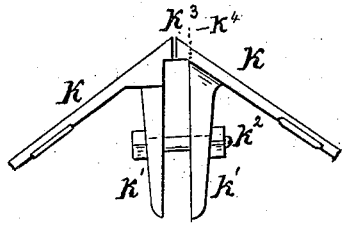
Figure 12:
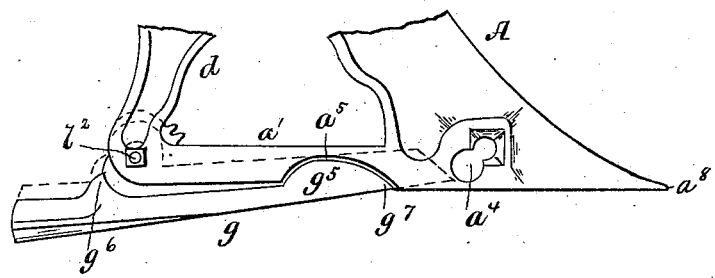
Figure 13:
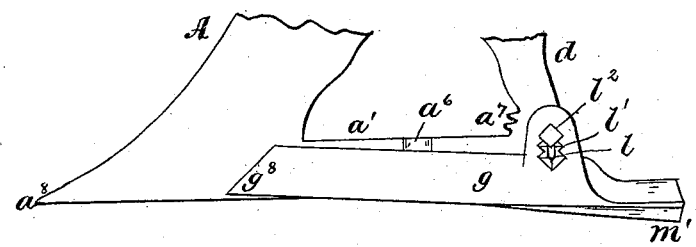
Figure 14:
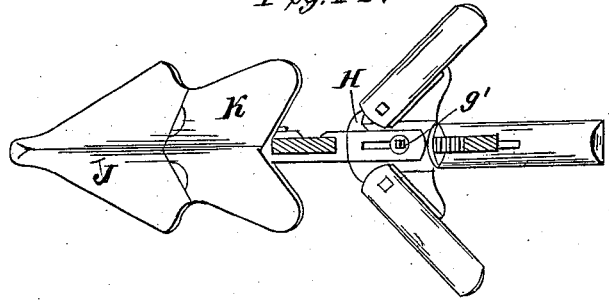
Figure 15:
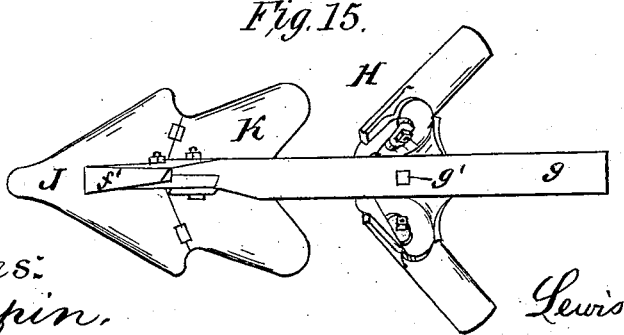

In the drawings, Figures 1 and 2 are elevations of the reverse sides of the standard. Fig. 3 is a rear elevation of a portion of the standard and of a portion of the handles. Figs. 4, 5, 6, and 7 are detail views of the casting or seat for holding the rear end of the beam and the handles. Fig. 8 shows a vertical section and a plan of the upper end of the standard. Fig. 9 shows the improved heel or landside. Fig. 10 is the share. Fig. 11 shows the mold-boards. Figs. 12 and 13 show the heel or landside attached to the standard. Fig. 14 shows a plan of the complete double mold-board plow, with the upper part of the standard broken away. Fig. 15 is a view of the under side of the complete plow.

In the construction of the standard employed in this plow I have in view to combine strength, durability, lightness, cheapness, freedom from choking, and perfect adaptability for the purposes hereinafter set forth.

A is the standard, which is composed of a main stem, $a\,a$, base $a'$, a rear stem or arm, $b$, a cross-brace, $c$, connecting the top of the main stem $a$ with the upper end of the rear inclined arm, a stem, $b$, and a lower arch brace or arm, $d$, which connects the rear end of the base $a'$ with the main stem $a$, or with the lower part or end of the rear arm, $b$. The lower front edge of the standard A is formed so as to provide a shoulder, $a^2$, against which the upper ends of the mold-boards will abut, and there are also formed through it suitable bolt-holes, $a^3\,a^4$. On the under side and extended slightly upward on one side there is formed a curved recess, $a^5$, which serves as a bearing in which is held a flange formed on the heel or landside, hereinafter described. The base has also a half-round vertical mortise, $a^6$, formed in one side, and it is provided with the teeth $a^7$, arranged in the angle between the brace $d$ and the rear end of said base. The standard A is made to slope backward very rapidly at an angle of about forty-five degrees from its point $a^8$, on a line very nearly straight for about three-fourths of its entire length. It is then curved forward in a long slender neck, $a^9$, which extends forward in a long thin beak or oval edge, $a^{10}$, which is on a line vertically over the position of the mold-boards, hereinafter described. The edge of the lip $a^{10}$ is made thin, and rests snugly against the under side of the beam, so that nothing can catch against it. A bolt-hole, $a^{11}$, is formed through the head or upper end, near the point $a^{10}$, through which the bolt $a^{12}$ is put. On the top of the standard there are formed the upwardly-projecting side flanges, $a^{13}$, convex on their inner sides and between which the beam is held. The top surface of the standard is made to decline gradually from the front edge of the beak $a^{10}$ backward, so that the beam rests only on the lip or point of the beak $a^{10}$. The rear end of the beam may be lowered, as hereinafter explained, and at the same time there will be preserved a close joint between it and the lip $a^{10}$. The flanges $a^{13}$ extend from the outer ends of the oval edge of the beak $a^{10}$ backward past the bolt-hole $a^{11}$ and well over the main body of the standards, and give strength to the long slender point and to that part of the standard surrounding the said bolt-hole. It is nearly impossible for the plow having a standard constructed as hereinbefore described to get choked. The trash is carried off to the sides by the form and arrangement of the neck and head of the standard. The lower end of the arm $b$ is attached to the main stem $a$, at a point low down on the latter, where there is little or no strain, and it is inclined backward as it is carried upward, so as to bring it in proper line for holding the handles. It is provided with the side flanges, $b'\,b'$, between which the handles are placed, and which give greater strength to the arm. The upper end of the arm $b$ is connected to the upper end or head of the standard A by the cross-brace $c$, which is a thin flat bar set on its edge, and has formed on its side a horizontal rib, $c'$, the upper surface of which is a continuation of the curved upper surface of the head of the standard. The inclined arms $b$ and the cross-brace $c$ give to the standard A strength able to stand against the severest strains. The arm $d$ extends downward from the lower end of the rear arm, $b$, and braces the end of the base $a'$.

B B' are the handles. The lower end of the handle B lies flat against the arm $b$, and between the flanges $b'$ $b'$. Its lower end is beveled to correspond with the outward slope given to the handle B'. The handle B' has its lower end beveled, to lie flat against the lower end of the arm $b$ and between the flanges $b'$ $b'$. It also lies flat against the lower beveled end of the handle B, and is carried outward at the proper slope to give the required width at the outer ends for the plowman. One bolt, $b^2$, is put through the arm $b$ and the lower end of the handle B', and another bolt, $b^3$, is put through the arm and through both handles at the point where the said handles are in contact. A third bolt is put through both handles and through the support $c$ and the arm $b$, at the upper end of the latter, thus securing together the standard, the beam, and the handles, so that the strain is not exerted on either of these parts separately. When thus held, the handles cannot move nor work loose, and, being arranged to diverge from a single point on the standard, a greater control is obtained over the plow than can be obtained by the ordinary arrangement of handles.

C is a support or casting for holding the rear end of the beam D. It is composed of a rear wing, $d$, a lateral arm, $d'$, and a supporting-arm, $d^2$. The wing $d$ lies flat against the handle B, its front edge projecting slightly, and forming an abutment for the rear end of the beam. It is held by a bolt, $d^4$, so that it may be raised or lowered at pleasure. The lateral arm is pierced by an oval or elongated hole, $d^3$, through which the bolt $b^4$ is put. It is made long enough to support the handle B' at a proper distance from the handle B, and it can be moved up or down on the bolt $b^4$ by reason of the elongated bolt-hole $d^3$. The single bolt $d^4$ holds the support C in place and the handles in position at the rear end of the beams. The bolt $b^4$ holds the rear arm, $b$, the handles B B', and support C, and gives support to the rear end of the beam. The supporting-arm $d^2$ projects forward and holds the rear end of the beam. It has a vertical slot, $d^7$, through which passes the single bolt $d^6$, for fastening the rear end of the beam, so that the latter can be adjusted laterally. It has also a horizontal slot, $d^5$, enlarged at its middle and formed across the upper face in line with the slot $d^7$, in which is placed an adjusting-bolt, $e$, on the ends of which are the adjusting-nuts $e'$. The bolt $e$ has a collar, $e^2$, formed intermediately between its ends, through which the bolt $d^6$ passes. The nuts $e'$ bear against the outer edges of the arm $d^2$, and by loosening one and tightening the other the end of the beam can be drawn laterally to any desired distance. By loosening the bolts $d^4$ and $b^4$ the casting or support C can be lowered, and thus the rear end of the beam is lowered. The gradual depression of the top face of the standard A in rear of the bolt-hole $a^{11}$ and the side flanges or jaws, $a^{13}$, permit the lowering of the rear end of the beam and at the same time furnish a stable and strong support for the beam in any of its changed positions. The depression of the bar $c$, so as to leave a space between it and the beam, permits the latter to be adjusted laterally over the top edge of said bar $c$, when desired. The share J has the central rib, $f$, arranged to lie alongside of the point of the standard A, to which it is secured by a suitable bolt through the hole $a^4$.

$f'$ is a wedge-shaped brace or flange, formed on or turned over and projecting laterally from the edge of the rib $f$. The forward end, $f^4$, of the flange is by preference made fast to the under side of the share, though it may be left detached, if desired. The brace tapers from its front end back to a point about vertically under the hole $f^2$—i. e., to a point sufficiently far to give the necessary strength to the metal in the rib at that point where the bolt-hole is formed, and also sufficiently far to protect and prevent the end of the standard from breaking when coming in contact with obstructions. This brace forms a socket and a covering and protection for the lower end or point, $a^8$, of the standard. This flange, by its peculiar shape and arrangement with reference to the rib $f$, forms a brace which gives strength to all the weak points of the rib, and a more substantial and economical socket than would be given by a socket closed on both sides, and at the same time all the requisite facilities are afforded for inserting and retaining the bolt in the holes $f^2$ $a^4$.

In addition to the hereinbefore-described construction I provide a supplemental rib, $f^5$, made parallel with the rib $f$, and just far enough away from the latter to form a channel into which the standard will slip and fit snugly. The supplemental rib $f^5$ makes a side brace, and, with the rib $f$ and brace $f'$, makes a pocket wherein the point of the standard will be held securely.

$g$ is the heel or landside, which is applied to the base of the standard A. It is held by a bolt, $g'$, put through the hole $g^2$, and through the weeder-stock H in the upper edge of the base $a'$. It is provided with the vertical outer side flange, $g^3$, which has the half-round mortise $g^4$ corresponding to the half-round mortise $a^6$, and forming therewith a passage, when desired, for the bolt $g'$ from the sole to the weeder-stock. On the opposite and inner edge there is formed the vertical curved flange $g^5$, which is thickened on its inner side, and adapted to fit into the recess or bearing $a^5$, formed in the inner lower side of the standard. It also has a spur, $g^6$, which extends upward behind the heel of the standard. The base of the standard rests between the flanges $g^3$ $g^5$, with its rear end abutting against the spur $g^6$, in which position the sole is firmly held by the bolt $g'$. The sole is also provided with an extension or spur, $g^7$, which abuts against the shoulder formed by the forward end of the recess $a^5$, while the end or point $g^8$ is beveled, and abuts against the beveled edge $f^3$ of the rib $f$ on the share J.

$l$ is a lug formed on the side of the sole and against the side of the spur $g^6$. It extends upward alongside of the base $a'$ and brace $d$, and has formed through it the slot $l'$, the sides of which are notched, as shown.

It will be understood that instead of having the slot $l'$ in the heel or landside, as shown, a simple round hole may be provided, and the bolt-hole in the heel of the standard may be elongated and the same results attained. I employ the lug or extension $l$, as shown, in order to dispense with a needless amount of metal. If the entire side $g^3$ of the heel or landside were extended up, as shown in dotted lines in the second and third parts of Fig. 9, it would not interfere with the working of the device.

By means of the slot and bolt the rear end of the heel or landside may be raised or lowered, as shown, for the purpose of raising or lowering the rear end of the plow and thereby giving a different set to the points of the share. The flange $g^5$ and projection $g^7$ on the forward end of the sole are so formed and applied to the standard as to permit the rear end of said sole to be moved, as indicated in Fig. 12. The heel or landside is held by a bolt, $l^2$, in any desired position. The under side, $m$, of the heel or landside $g$ is made V-shaped, so as to form a central longitudinal edge, $m'$, which cuts into the bottom of the furrow, and prevents the plow from sliding laterally, thereby insuring a steadier movement. The rear end of the heel or landside is extended beyond the heel of the standard, as shown, whereby the rear or backward tilting of the plow is prevented. The V-shape form of the under face of the heel or landside extends from the rear end thereof about one-third the entire length, and the angle, which is acute at the rear end, gradually grows more obtuse till it merges into the flat or horizontal face which appears under the forward part of the heel or landside. This formation of the heel or landside, with the V-shape edge at its rear end gradually diminishing as it extends forward, and with a flat or horizontal face under its forward end, gives steadiness to the movement of the plow, and does not increase the friction, whereby the draft would be increased.

In Fig. 11 the construction of the double mold-boards K is shown. They are formed with lugs K', which project downward along the sides of the standard A, to which they are both held by the one single bolt K². Their abutting edges K³ project beyond the lugs K' and over the front edge of the standard A, forming a close joint, as shown. Their upper ends abut against the shoulder $a^2$.

Instead of having both mold-boards made with side extensions, K³, each extended halfway over the front edge of the standard, one only of said mold-boards may have the extension made to extend entirely across the edge of standard, and the other mold-board may be snugly abutted against it, as shown at the dotted line K⁴, Fig. 11. I prefer to make both as shown.

If it be desired to remove one of the mold-boards and have the other attached, for purposes of throwing the earth in one direction only, the extensions K³, covering half the front edge of the standard, will so protect the latter that very little if, indeed, any injury by friction of the earth will be sustained.

The spur $g^6$ may or may not be formed as shown. It serves chiefly to give a better seat for the heel of the standard. It also adds strength when the heel or landside is laid snugly against the under edge of the standard.

It will be understood that the rear seat for the beam need not be made in a separate casting, as shown.

The seat having the slots $d^4$ $d^5$ can be formed on and as a part of the standard, and when so formed the same adjustments can be secured by the movement of the adjusting-bolt $e$.

I prefer to make the seat in a separate casting, as hereinbefore described.

The landside, as before described, is pivoted at its forward end, and it is adapted, in connection with its other functions, to serve as a sole-piece and throw the rear end of the plow up as the corresponding end of the sole-piece is lowered by means of the adjustment thereof, before described. In its adjustment the landside is, in effect, pivoted at its extreme forward point, the portion extended in advance of its pivotal point having no use whatever in the operation of adjustments.

By means of the adjustment of the plow-beam, as has been described, the point of the plow may be raised or lowered, and supported firmly as the rear end of the sole-piece or landside is adjusted up or down, as may be desired.

Having thus described my invention, what I claim, and desire to secure by Letters Patent, is—

1. The combination, with the beam, the seat C, provided with a vertical bolt-opening, and the bolt for holding the beam to the seat, of an adjustable bolt provided with adjusting-nuts on its opposite ends, arranged transversely to, and adapted to engage the beam-holding bolt, whereby the rear end of the beam may be adjusted laterally, substantially as set forth.

2. The combination, with the share J, of the depending wing $f$ and wedge-shaped brace $f'$, formed or turned laterally upon the lower edge of the wing $f$, having its forward end resting against the share and its rear end extended back on the lower edge of said wing $f$, whereby a socket open at its side is provided for the point of the standard-base, substantially as set forth.

3. The improved share for plows, consisting of the body J, the depending wing or lug $f$, the brace $f'$, fixed or formed on the lower edge of the wing $f$, and having its forward end resting against the under surface of the body of the share, and its rear end extended back along the lower edge of said wing $f$, and the feather or brace $f^4$, arranged parallel with the wing $f$, whereby a lateral side brace or support and a socket, open at its side, are provided for the point of the standard, as set forth.

4. The removable landside or heel $g$, constructed with the outer and inner flanges, $g^3$ $g^5$, and adapted to fit in the base $a'$, substantially as set forth.

5. The combination, with the standard-foot having a curved or semicircular recess or seat, $a^5$, formed intermediately its point and heel, of a removable landside having a seat on its upper side for the standard-foot, and a curved flange projected upward and fitting into the recess or seat $a^5$, and means whereby the landside or heel is held to the standard-foot and adjusted vertically at its rear end, substantially as set forth.

6. In a plow, the removable landside $g$, having on its upper side a seat for the base or foot of the standard, and having the rear part of its under or wearing-face made V shape, and the forward part of said wearing-face made flat or horizontal, as and for the purposes set forth.

7. The combination, with the standard, of the share having the depending wing $f$, arranged to fit snugly against the side of the forward end of the base of the standard, and having its rear edge, $f^3$, inclined downward and forward, and the removable landside $g$, placed below the base $a'$, and having the end $g^8$ snugly abutted against the edge $f^3$ on the wing of the share, as set forth.

8. The combination, with the standard A, having a side recess, $a^5$, of the landside $g$, constructed with the flange $g^5$ and extension $g^8$, and suitable fastening, substantially as set forth.

9. In a plow, the removable landside $g$, placed under the standard, and having a seat on its upper side for the standard-base $a'$, a heel-spur, $g^6$, placed at the rear end of the standard-seat and extending upward behind the heel of the standard, a slotted lug, $l$, extended upward against the side of the standard-base, and means whereby the landside is secured and held adjustably in its position, as set forth.

10. In a plow, the combination, substantially as hereinbefore set forth, of the main stem $a$, having a seat for the beam on its top, the rear stem or arm, $b$, arranged in rear of stem $a$ and inclined backward, and having a channel or mortise on its side to receive the lower ends of the handles, and having its upper end arranged opposite the support or seat for the rear end of the beam, the handles B B', secured in the mortise in the side of the arm $b$, a support or seat for the rear end of the beam, placed between the handles, and the bolt $b^4$, put through the handles, the rear beam-seat, and the upper end of the arm $b$, as described.

11. In a plow, a share having a depending wing or lug and a lateral brace or wing extended from the lower edge of the depending wing, whereby a socket open at one side is provided to receive the point of the base of the standard, as set forth.

12. The combination, substantially as hereinbefore set forth, of the standard, the two mold-boards K K, having their adjacent edges snugly jointed together and covering the front edge of the standard, and having rear lugs extended back alongside of and on opposite sides of said standard, and a retaining-bolt, substantially as and for the purposes specified.

13. In a plow, the combination, with a landside or heel pivoted at its forward end, and provided at its rear end with means for vertical adjustment, of a beam and means for the vertical adjustment of the rear end of the beam, whereby the draft end thereof may be raised or lowered, substantially as and for the purposes set forth.

In testimony whereof I affix my signature in presence of two witnesses.

LEWIS B. WHITE.

Witnesses:
GEO. A. DIGGES,
T. V. GRIFFIN.